May 3, 1960     F. G. EUBANKS     2,934,982
WIRE CUTTER AND INSULATION STRIPPING APPARATUS
Filed July 2, 1956     3 Sheets-Sheet 1
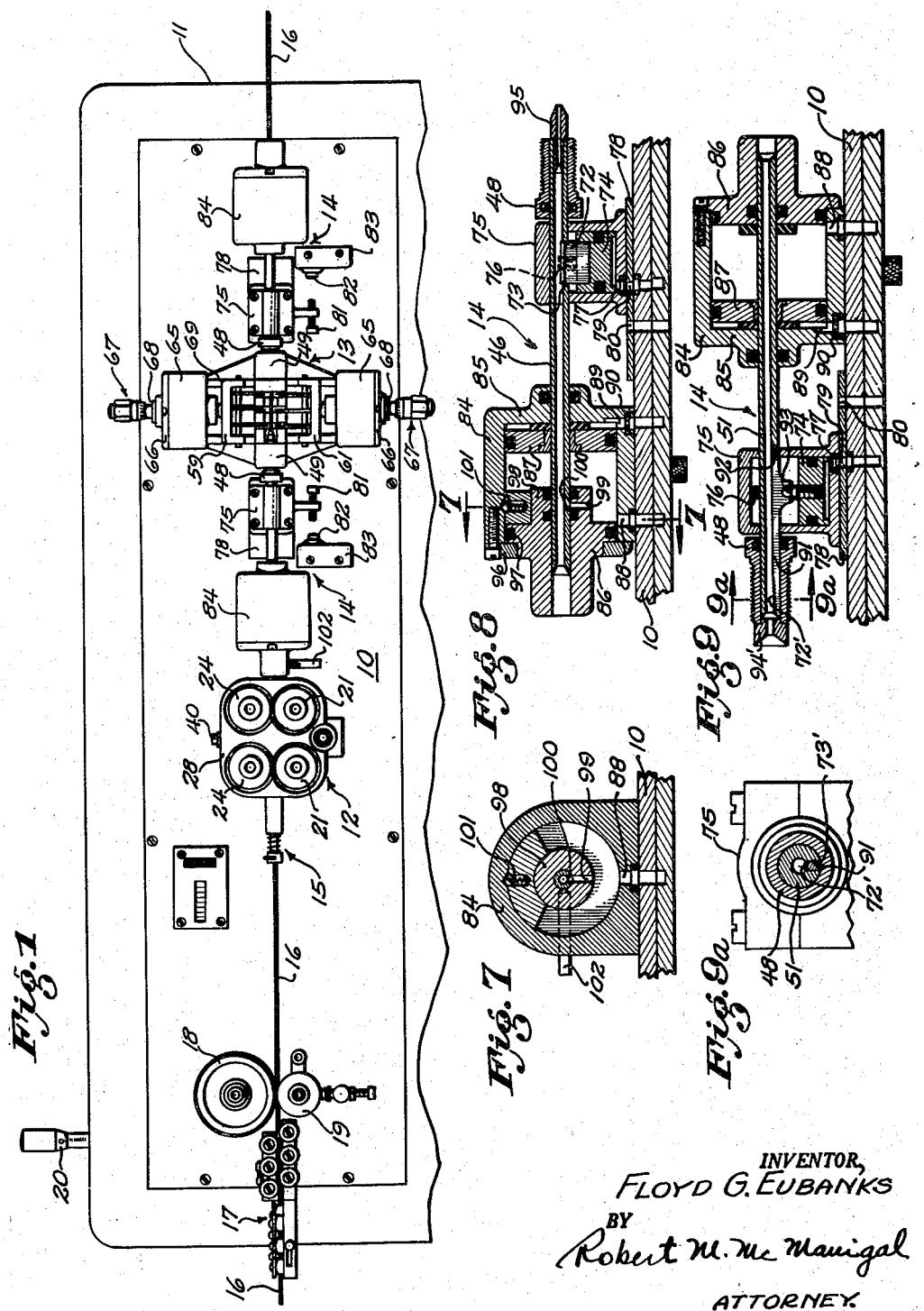
INVENTOR,
FLOYD G. EUBANKS
BY
Robert M. McManigal
ATTORNEY.

May 3, 1960  F. G. EUBANKS  2,934,982
WIRE CUTTER AND INSULATION STRIPPING APPARATUS
Filed July 2, 1956  3 Sheets-Sheet 2
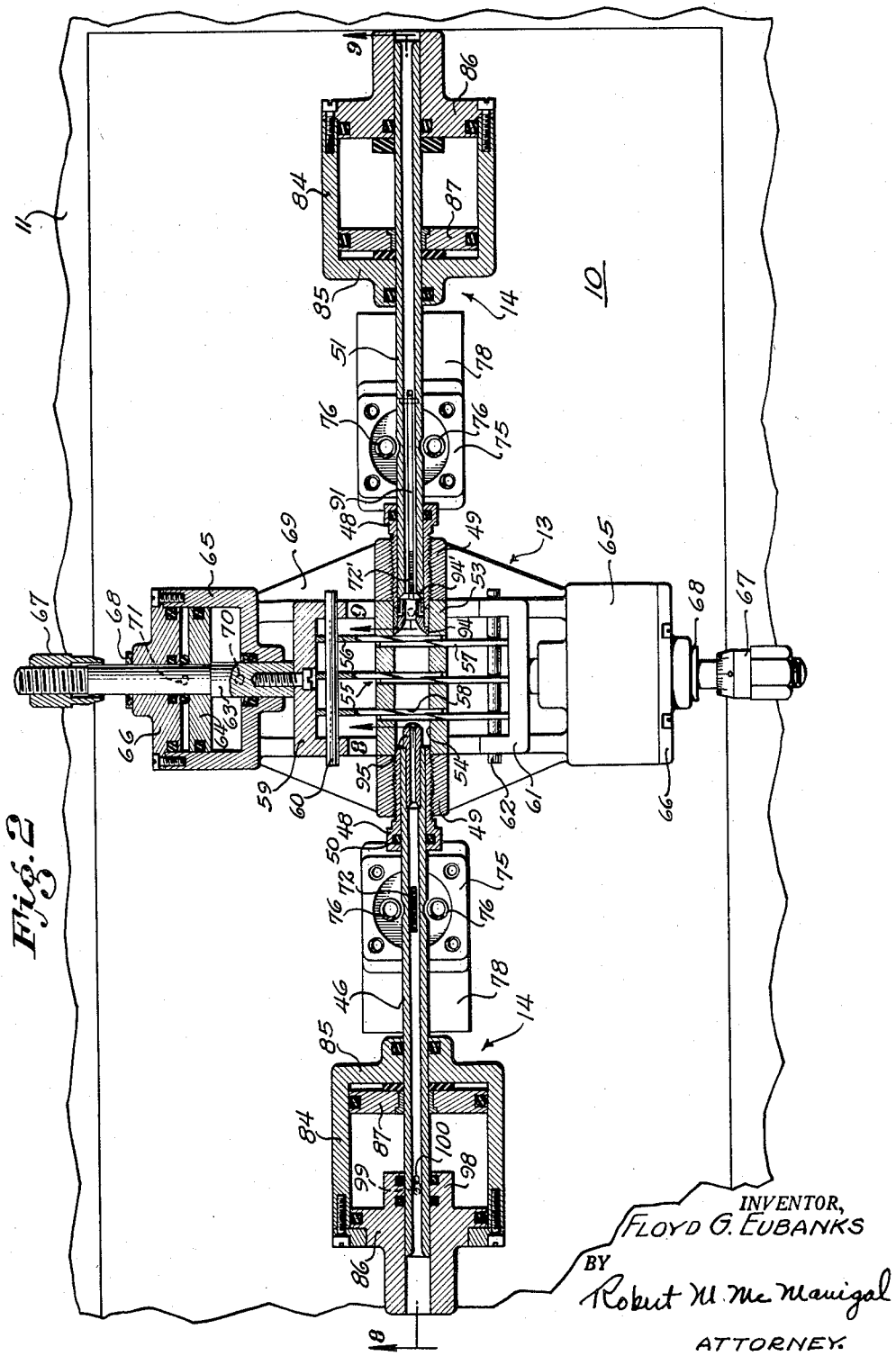
INVENTOR,
FLOYD G. EUBANKS
BY
Robert M. McManigal
ATTORNEY.

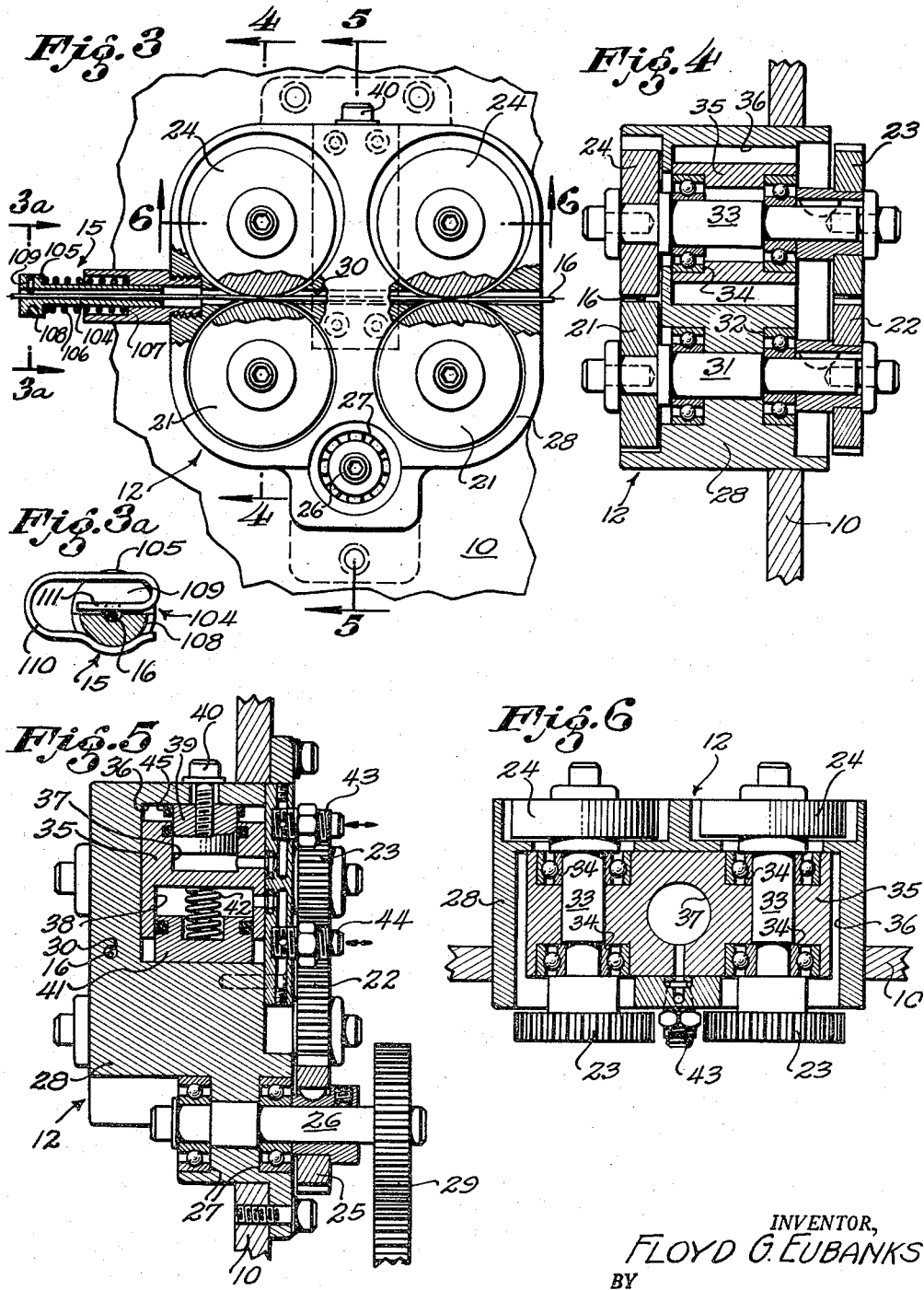

United States Patent Office 2,934,982
Patented May 3, 1960

2,934,982
WIRE CUTTER AND INSULATION STRIPPING APPARATUS

Floyd G. Eubanks, Pasadena, Calif., assignor of ten percent to Robert M. McManigal, South Pasadena, Calif.

Application July 2, 1956, Serial No. 595,338
11 Claims. (Cl. 81—9.51)

The present invention relates generally to the art of severing filament like materials into predetermined lengths, and is more particularly concerned with improvements in apparatus for the cutting and stripping of insulated wires.

The present application constitutes a continuation-in-part of my copending application, Serial No. 452,854, filed August 30, 1954, now Patent No. 2,884,825, issued May 5, 1959, entitled Wire Cutter and Insulation Stripping Apparatus.

In my above mentioned copending application, apparatus was disclosed for the cutting and stripping of filamentary materials, such as insulated wire conductors, in which the main components were pneumatically powered and actuated. It is one object of the present application to provide refinements and improvements in the respective components so that the apparatus may be operated with greater facility and ease, and wherein greater accuracies of cutting and determination of cut lengths of material may be obtained.

A further object of the invention is to provide a unique microadjustment in connection with the cutter blades, which will permit minute variations and adjustments so that the blades will cut the insulation with exacting precision.

A further object is to provide in connection with the gripping jaws of the stripping mechanism, improved connection between the jaw member and pneumatic operating device.

Another object is to provide a unique support for feeding extremely fine wire to the cutters, wherein a hair like filamentary material will be advanced and supported upon an air stream.

Another object is to provide in connection with the wire supporting air stream, unique valving means for controlling the air stream, this valving means being so arranged that it may be selectively actuated to provide the stream when cutting fine wire, and cut off the air stream when it is not required.

Still another object is to provide an improved feeding roller mechanism wherein pneumatic actuators are utilized to move the feed rollers into feeding position and nonfeeding position, and the utilization of spring means for normally holding the feed rollers in open position so that the wire may be more readily threaded through the feed rollers.

It is also an object to provide improved simplified means for delaying the actuation of the stripper mechanism with respect to the actuation of the cutters. Further objects of the invention will be brought out in the following part of the specification, wherein detailed description is for the purpose of fully disclosing the invention without placing limitations thereon.

Referring to the accompanying drawings, which are for illustrative purposes only:

Fig. 1 is front elevational view of apparatus embodying the features of the herein described invention;

Fig. 2 is an enlarged fragmentary view of the cutter and stripping mechanisms, certain portions being shown in longitudinal section in order to more clearly disclose the operative relationship of the various parts;

Fig. 3 is an enlarged fragmentary front elevational view, partly in section, showing details of construction of the feeding mechanism;

Fig. 3a is a transverse sectional detail view of the tensioning means, taken substantially on line 3a—3a of Fig. 3;

Fig. 4 is a sectional view of the same, taken substantially on line 4—4 of Fig. 3;

Fig. 5 is a vertical section, taken substantially on line 5—5 of Fig. 3;

Fig. 6 is a transverse sectional, taken substantially on line 6—6 of Fig. 3;

Fig. 7 is a sectional view of the valve mechanism for the wire supporting air stream, taken substantially on line 7—7 of Fig. 8;

Fig. 8 is a fragmentary horizontal section, taken substantially on line 8—8 of Fig. 2;

Fig. 9 is a similar sectional view, taken substantially on line 9—9 of Fig. 2; and Fig. 9a is a transverse sectional view, taken substantially on line 9a—9a of Fig. 9.

Referring more specifically to the drawings, the apparatus of the present invention includes a number of component assemblies which are supported in cooperative relationship upon a main mounting panel 10. This panel is fabricated from suitable material and is preferably in the form of a rigid metallic sheet or plate, and is secured in an upright position in a suitable cabinet 11 by conventional means. Briefly, these assemblies, which will subsequently be described in detail, may be generally referred to as the feeding mechanism 12, a cutting mechanism 13, stripping mechanisms 14—14 and wire tensioning means 15.

The apparatus is susceptible of general application for the cutting of different types of filamentary material such as wire, cord, rubber or other filamentary materials composed of different substances. However, the apparatus has been primarily designed for use in the cutting and stripping of insulated wire such as commonly employed for electrical wiring purposes, and the apparatus will be described in connection with such use. In general the component assemblies are in the main basically like those of my copending application, except that they have been modified in the present embodiment for obtaining greater flexibility of operation and greater precision of cutting so that the apparatus may be utilized with extremely fine filamentary materials as well as those of heavier construction.

Wire, as generally indicated by the numeral 16, will be fed from a reel or other source (not shown), into a wire straightening device 17 of conventional construction, and thence to a length measuring mechanism which includes a measuring wheel 18 against which the wire is held by means of a spring presser wheel 19 similar to that described in my copending application. Briefly, the measuring wheel is associated with cycling control for determining the sequence of operation of the cutter and stripping mechanisms, and which will not be described in detail in this application. A micrometer adjustment 20 is shown which provides precision control of the lengths of wire to be cut.

From the measuring wheel, the wire passes through the wire tensioning means 15, which will be described later, and thence into the feeding mechanism 12.

The feeding mechanism comprises a plurality of sets of feed rollers, shown in the present instance as embodying two sets of feed rollers, although additional sets may be utilized, if necessary. As best illustrated in Figs. 3 to 6 inclusive, each set of these rollers comprises a lower wire engaging roller 21 with an associated pinion 22. The lower rollers have their pinions 22 in driving relation with pinions 23 associated with upper rollers 24, in each case. The pinions 22 mesh with a common drive pinion 25 which is carried by a drive shaft 26 supported in antifriction bearing 27—27 mounted in a housing structure 28. The drive shaft is actuated through a suitable gear chain 29 from an appropriate power source (not shown), but which may be an electric motor.

The housing is provided with an elongate passageway 30 which guides the wire 16 between the feed rollers, the passageway being cut out adjacent the rollers to permit the roller peripheries to engage the wire and upon rotation feed it through the passageway.

The feed rollers are arranged for relative movements so that each pair of feed rollers may be moved into feeding position in engagement with the wire, and slightly separated so that feeding of the wire will be terminated. For this purpose, each lower roller 21 and associated lower pinion 22 are mounted on a shaft 31, this shaft being rotatably supported in antifriction bearings 32—32 mounted in the lower portion of the housing structure 28. Each upper roller 24 and associated pinion 23 are carried by a shaft 33 which is rotatably mounted in antifriction bearings 34, these bearings being supported in a block 35, as best shown in Fig. 6. The block 35 is guidingly supported within a recess 36 of the housing structure 28 for limited vertical movement.

As shown in Fig. 5, the block 35 is centrally formed with axially aligned recesses 37 and 38 which respectively open into the upper surface and lower surface of the block to form cylinders. The upper recess or cylinder 37 has a piston 39 operatively associated therewith, this piston being fixedly secured to the frame structure by means of a stud bolt 40. The recess or cylinder 38 is correspondingly associated with a piston 41 which is biased in a downward direction into abutting relation with the adjacent wall of the recess 36 by a compression spring 42 which extends between the piston 41 and the bottom of the recess or cylinder 38.

The spring 42 normally acts to separate the upper and lower feed rollers so as to facilitate threading of the wire 16 therebetween. However, during normal operation of the machine, the rollers are moved into and out of feeding engagement with the wire by controlling the supply of actuating fluid such as air into the cylinders 37 and 38.

For example, admission of air into connection fitting 43 and connected passage to the cylinder 37 acts to motivate the block 35 downwardly to bring the feed rolls into feeding position with the wire. Admission of air to the connection fitting 44 and associated passages to the cylinder 38 acts to motivate the block 35 in an upward direction so as to move the feed rollers out of feeding engagement with the wire. Positive operation of the feed rollers is thus obtained in proper timed sequence with respect to the cutting and stripping operations which will subsequently be described. The upper movement of the block 35 is cushioned at its uppermost limit by means of a resilient bumper ring 45 at the upper end of the piston 39.

As in the case of my copending application, the feeding mechanism is intermittently operable to feed the wire into the cutting mechanism 13, but is arranged to terminate the feeding operation during the cutting or severing of the wire, and during the operation of the stripping mechanism 14. After the desired length of wire has been fed through the cutting mechanism, as determined by the operation of the measuring wheel 18 of the length determinating means, the feed mechanism will be inactivated so as to cease the feeding operation during the cutting operation and subsequent stripping.

Referring now to Figs. 1 and 2, the wire is conducted from the passageway 30 of the feeding mechanism through a tubular guide member 46 to the cutting mechanism 13. One end of the guide member 46 is slidably supported for limited axial movement in a fluid actuating cylinder, for a purpose to be subsequently explained. The other end of the tube 46 is supported for sliding movement within in a bushing 48 which is threadedly mounted in a strip block 49 mounted on the cutter mechanism, a sealing gasket being provided to prevent air leakage between the bushing and the tubular guide member. At the opposite side of the cutting mechanism, there is provided a similar strip block 49 and bushing 48 which slidably supports one end of tubular guide member 51, the other end of this member being similarly supported for limited axial movement in a fluid actuating cylinder. This tubular guide member serves to conduct the severed wire portions to a point of discharge at the right end of the apparatus.

Referring more specifically to the cutter mechanism, as shown in Fig. 2, the cutter mechanism embodies a cutter spacing block 53 having a longitudinally extending bore 54 which is adapted at its ends to receive the adjacent ends of the bushings 48, which thus act to retain the cutter spacing block in operative position. The tubular bore 54 provides passage for the wire through the cutting blades. The cutting blades comprise a plurality of sets of blades 55, each set comprising an upper blade 56 and a lower blade 57. These sets of blades have cooperatively associated cutting edges which operate in a manner well known in the art of wire cutting and stripping. Briefly, however, the central set of cutting blades have cutting edges adapted to cut through the wire and completely sever it, whereas the sets of cutting blades on each side of the central set are arranged to cut through the insulation only. The spacing between the sets of blades, and the consequent length of insulated portion which is to be severed is determined by blade guide slots 58 which are appropriately spaced and extend vertically through the cutter spacing block.

The upper blades 56 are supported in a head member 59 by means of a pin 60 which passes through an aperture in each of the associated blades. In a similar manner, the lower blades 57 are supported in a head member 61 on a pin 62. To change the length of the insulated portion which is to be removed from the wire ends, it is only necessary to utilize a cutter spacing block 53 having the correct slot spacing therein for guiding the blades.

The head member 59 has an operative connection with a stem 63 which is arranged to be reciprocably actuated by movement of a connected piston 64 in a double acting air cylinder 65. The stem 63 is extended through a cylinder cap 66, the projecting end being provided with a micrometer stop adjustment 67 which is adapted upon downward movement of the piston to strike against a stop washer 68 and thus limit and determine the cutting depth of the cutting blades with precision adjustment. In a similar manner, the head member 61 is connected with a similar fluid actuator and micrometer stop adjustment.

The air cylinders 65 are shown as being fabricated as a part of a frame structure 69 which is secured to the face of the main mounting panel 10 by conventional means. Each air cylinder is provided with port connections 70 and 71 at the respective cylinder ends through which actuating air may be selectively supplied from suitable control (not shown) to move the blades towards cutting position and away from cutting position.

With respect to the stripping mechanism 14, substantially similar mechanisms are positioned on opposite sides of the cutting mechanism 13, these stripping mechanisms being arranged to institute relative movement between the severed ends of the wire core and the associated severed insulation sections.

The stripping mechanism 14, which is positioned on the feed side of the cutter mechanism, will be first described with respect to details of construction which are primarily most clearly shown in Fig. 8. As there shown the stripping mechanism embodies a pneumatically operable jaw 72 which extends through a side opening 73 in the tubular guide member 46. The jaw 72 is carried by a small piston 74 which is cooperatively associated with and reciprocable within an air cylinder 75, this cylinder being secured to and supported at its outer end upon the tubular guide member 46 for reciprocable movement therewith for a purpose to be subsequently explained.

The piston 74 is normally biased by coil compression springs 76—76 towards the bottom of its associated cylinder, in which position the jaw 72 is retracted with respect to a wire passing through the tubular guide member. At its innermost end, the cylinder 75 is provided with a port opening 77 by which air may be admitted and exhausted from the cylinder. The inner end of the air cylinder is in sliding engagement with a plate member 78 which is secured on the adjacent face of the main panel 10. This plate has a passage 79 therethrough which is shown as being in registration with an air supply channel.

With the port opening 77 in registration with passage 79, air under pressure will be admitted into the bottom of the cylinder and will cause the piston to be moved against the action of the springs 76 to a position in which the jaw 72 will be moved into gripped relation with the adjacent surface of the wire 16. It will now be seen that if the tubular guide member 46 is shifted towards the left, by suitable actuator means which will be described subsequently, the air cylinder will be moved to a position wherein the port opening 77 will be disconnected with respect to the passage 79 and connected with an exhaust passage 80 which will permit movement of the piston and jaw to a position in which the jaw will have ungripped relation with respect to the wire 16.

During movement of the air cylinder 75 towards the left, tension will be applied to the wire 16 and it will be axially longitudinally moved in such a manner that the end portion will be withdrawn from the associated insulation section which will be retained and held against movement with the wire by the blades of the cutting mechanism, these blades at this time being in closed position. Moreover, the feed rollers will at this time be disengaged with respect to the wire 16 by supplying air into the recess or cylinder 38. Upon movement of the cylinder as just described, an adjusting screw 81, supported for movement therewith, will engage an operating button 82 of a control switch 83. This switch forms a part of the control as described in my copending application, but which does not form a part of the present invention.

The tubular guide member 46 is longitudinally shifted by means of an air cylinder 84 mounted in fixed position on the panel 10, the cylinder being concentric with respect to the member 46 and having end sections 85 and 86 which are in sealing engagement with the tubular guide member end supported for reciprocable movement within the cylinder 84. A piston 87 is operatively associated with the cylinder 84 and is centrally secured to the tubular guide member so that it in effect forms a piston rod. The opposite ends of the cylinder 84, which communicate with the opposite sides of the piston 87, are connected with port openings 88 and 89 which are respectively connected to air supply channels. A disc 90 is mounted in association with the port opening 89, this disc having a restricted opening at its center for the purpose of effecting time delay operation of the stripping movement of the tubular guide member 46 with respect to the cutting operation of the blades, thereby assuring that the stripping operation will take place after the cutting operation has been completed. The preceding manner of obtaining time delay is very simple and eliminates the more complex use of time delay valves and other complicated devices.

The stripping mechanism 14 as shown on the discharge side of the cutting mechanism, is of similar construction to that previously described above, and similar numerals have been utilized to indicate similar elements therein. As clearly shown in Fig. 9, the primary difference resides in the construction and mounting of the jaw structure for gripping the wire. More specifically, instead of the jaw being mounted within the cylinder 75 as previously described, the jaw as indicated at 72' is positioned within the adjacent bushing 48 where it may be utilized to grip the severed wire sections, when these sections are relatively of short length. The jaw 72' is formed at one end of an elongate lever 91 which is positioned in an elongate slot or side opening 73' (Fig. 9a), the opposite end of this lever being swingably supported on a pivot member 92. Intermediate its ends and within the cylinder 75, the piston 74 is connected with the lever by means of a ball and socket connection 93, thus providing universal movement and flexibility between these connected members in order that trouble free operation will be obtained.

Adjacent the jaw 72', an ejection nozzle 94 is secured to the innermost end of the adjacent bushing 48. As shown in Fig. 2, this ejection nozzle is provided with nozzle openings 94' which connect with an air supply and are adapted to direct a stream of pressurized air into the adjacent end of the tubular guide member 51. This stream of air travels down the tubular guide member and carries with it the severed end of the wire which is thus delivered to a point of discharge at the right end of the tubular guide member.

On the feed side of the cutting mechanism, the adjacent end of the tubular guide member 46 is provided with a wire guide nozzle 95 which is arranged to support the entering wire in close proximity to the first pair of cutting blades. The size of this nozzle may be selectively varied depending upon the diameter of wire which is being worked upon.

Heretofore, it has been very difficult indeed to utilize apparatus of this character for cutting and stripping very fine filamentary materials, particularly where these materials have been so small as to be so flexible as to be substantially nonself-supporting. In the apparatus described herein, provision has been made wherein the problem of supporting extremely fine wire has been solved by utilization of a supporting air stream. The mechanism by which this is accomplished will now be described.

Referring again to Fig. 8, the end section 86 of the stripping mechanism on the feed side of the cutting mechanism is supported and rotatably retained in operative position by means of a cap ring 96 (Fig. 8). The periphery of the end section is sealed by means of a circumferentially extending O-ring 97. The end section has an inwardly projecting bushing portion 98 which has a radially extending bore passage 99 adapted to register with a wall passage 100 in the wall of the tubular guide member 46 during the feeding interval and when the end section 86 is circumferentially positioned at a predetermined point of its rotation. A spring detent 101 is adapted to cause the rotation of the end section 86 to dwell in the correct position, when the section is rotated by means of a handle member 102 (Figs. 1 and 7). With the bore passage 99 in registration with the wall passage 100, air will be fed into the tubular guide member 46 and in moving out through the nozzle 95 will set up an air stream which will support the very fine filamentary materials within the cutters. For larger materials which are more or less self-supporting, the air may be discontinued simply by turning the section 86 so that the bore passage 99 will be moved out of registration with the wall passage 100.

The apparatus of the present invention also incorporates unique means for applying tension on the filamentary material to more effectively control the movement of the wire to the cutting mechanism by means of the feeding mechanism. Referring to Figs. 3 and 3a, there is provided at the entrance of the wire into the passageway 30 of the feeding mechanism, a tubular sleeve 103 which reciprocably supports therein a smaller tubular member 104 having a head portion 105 at its outermost end. This smaller tubular member is biased against movement in a feeding direction of the wire by means of a coiled compression spring 106, one end of this spring bearing against a shoulder 107 in a counterbored portion of the tubular sleeve, and the other end of this spring bearing against the head 105. Moreover, the head portion 105 is provided with a circumferentially extending groove 108, a portion of this groove being in the form of a slot 109 which extends into the bore passage of the tubular member 104, as shown in Fig. 3a. This groove and slot are arranged to receive therein the opposite legs of a U-shaped member 110 of resilient material, this member having an end portion 111 which is adapted to frictionally bear against the wire 16 and form a drag on its movement. Due to this drag effect, the head portion 105 will be moved against the effect of spring 106 during the wire feeding operation. Upon the wire being severed, and the feeding rolls released, the compression spring 106 will act to move the head 105 in the opposite direction and thus reverse the movement of the wire 16 for a small distance so as to carry it rearwardly and prevent its being forced against the cutter blades, or in the case of fine wire from piling up.

The operation of the apparatus of the present invention will now be briefly summarized.

Prior to the starting of the cutting and stripping operation, the wire is threaded through the apparatus, first passing through the straightening device 17, thence through the length measuring mechanism in contact with the measuring wheel 18, through the tensioning means 15, the feeding mechanism as generally indicated at 12 where the wire passes between the lower feed rollers 21 and upper feed rollers 24, thence through the guide tube of the left hand stripping mechanism 14 (Fig. 1), between the cutting blades, and thence through the right hand stripping mechanism (Fig. 1) from whence it is discharged at the right side of the apparatus.

Assuming now that the cutters have just completed a cutting operation and have opened to again permit the passage of the required length of wire to be cut, the other components being in the position shown in Fig. 1. At this point, the control (not shown) will have operated to have admitted fluid into cylinder 37 of the feeding mechanism so as to lower the upper feed rolls 24 into engagement with the wire thus starting a feeding operation of the wire through the cutters. Simultaneously with the wire feed, the measuring wheel 18 is operated and through the actuation of cycling control associated therewith determines the operation of the cutter and stripping mechanism. As soon as the required length of wire is passed through the feeding mechanism, as determined by the setting of the micrometer adjustment 20, the control operates to stop the feed by supplying fluid to the cylinder 38 so as to disengage the feed rollers from the wire, and the same time the control supplies fluid to the outer ends of the air cylinders 65 so as to motivate the cutters and perform the cutting operation.

At the same time, fluid is supplied to the cylinders 75 so as to actuate the gripping mechanism and force the jaws 72 and 72' to grip the wire on opposite sides of the cuttters. At the same time, fluid is supplied through the port openings 89 into the cylinders 84. However, the movement of the piston to institute an insulation stripping action is not immediately accomplished, but is delayed due to the fact that the supply of actuating fluid is delayed by the action of the restricted opening contained in the disc 90. After a slight delay, the gripping jaws are moved apart so as to strip the insulation from the ends of the severed wire. This action bodily moves the cylinder 75 to a position wherein the actuating fluid will be exhausted so that the jaws will be released with respect to the wire. At the conclusion of the stripping action, the screws 81 function to actuate the control switches 83 which then functions through control (not shown) to supply fluid to the opposite ends of the cylinder 65 to open the cutters. At the same time, fluid is supplied to the opposite ends of the cylinders 84 so as to restore the jaw operating cylinders 75 to their normal position for the next stripping operation.

Exhaust air from the actuating cylinder 65 for the cutters, or from some other suitable source is conducted through ejection nozzle 94 (Fig. 2) which operates to eject the severed piece of wire from the right side of the apparatus into a suitable container.

The action described above is cyclically repeated and continues so long as the machine remains energized and wire is fed thereto. Upon completion of the cutting of the required number of pieces of wire, the machine may be automatically or manually stopped.

Various modifications may suggest themselves to those skilled in the art without departing from the spirit of my invention, and, hence, I do not wish to be restricted to the specific form shown or uses mentioned, except to the extent indicated in the appended claims.

I claim:

1. In apparatus for cutting a filamentary material into predetermined lengths: cutters selectively operable to cutting and noncutting positions; a lever pivoted at one end for swinging movements; a jaw member carried by the other end of said lever and movable thereby into engaged and disengaged relation with said material; a cylinder; a piston operatively associated with said cylinder; a ball and socket connection between said piston and said lever; means to energize said piston and activate said jaw into engaged relation with said material in timed relation to movement of said cutters to cutting position; and means for bodily moving said cylinder, piston, and jaw in a direction to strip the insulation from the severed end of the filamentary material.

2. In apparatus for cutting a filamentary material into predetermined lengths: cutters selectively operable to cutting and noncutting positions; a lever pivoted at one end for swinging movements; a jaw member carried by the other end of said lever and movable thereby into engaged and disengaged relation with said material; a cylinder; a piston operatively associated with said cylinder; means connecting said piston with a point between the ends of said lever; means to energize said piston and activate said jaw into engaged relation with said material in timed relation to movement of said cutters to cutting position; and means for bodily moving said cylinder, piston, and jaw in a direction to strip the insulation from the severed end of the filamentary material.

3. Apparatus for cutting an extremely fine flexible filamentary material, comprising: a pair of cooperative cutter blades supported for movements to cutting and noncutting positions; a tubular member having a nozzle end positioned adjacent to but spaced from said cutter blades, said member serving to guide a filamentary material therein to said nozzle; means for introducing a positive flow of air through said tubular member and out through said nozzle to propel said material towards said cutters and form an air stream between said nozzle and said blades for supporting a projecting free end portion of the material beyond said nozzle end for movement to a cutting position between said blades; and means for actuating said cutters.

4. Apparatus for cutting an extremely fine filamentary material flexible under its own weight, comprising: a pair of cooperative cutter blades supported for movements to cutting and noncutting positions; a tubular member having a nozzle end positioned adjacent to but spaced from said cutter blades, said member serving to guide a filamentary material therein to said nozzle; means for introducing a positive flow of air through said tubular member and out through said nozzle to propel said material towards said cutters and form a concentrated air stream for surrounding and laterally supporting the material in the space between said nozzle end and said blades prior to their movement to a cutting position; valve means for controlling admission of air to said tubular member; and means for actuating said cutters.

5. Apparatus for cutting an insulated filamentary material, and stripping the insulation from a severed end thereof, comprising: cutters operable to closed position to sever said material and adjacent end portion of insulation; a tubular member through which the filamentary material is guided to said cutters, one end of said member being positioned adjacent said cutters; gripping means carried by said member, and operable to grip said filamentary material following a cutting operation; a cylinder having said tubular member supported for axial reciprocable movement therein; a piston carried by said tubular member, and being movable in said cylinder to axially move the tubular member and gripping means to strip the insulation from the severed end; a port for admitting air from said cylinder for flow through said tubular member and discharge in a stream from said one end, whereby the material is supported and guided by said air stream into the cutters from said one end; and valve means for opening and closing said port to control flow of air therethrough.

6. Apparatus for cutting an insulated filamentary material, and stripping the insulation from a severed end thereof, comprising: cutters operable to closed position to sever said material and adjacent end portion of insulation; a tubular member through which the filamentary material is guided to said cutters, one end of said member being positioned adjacent said cutters; gripping means carried by said member, and operable to grip said filamentary material following a cutting operation; a cylinder having a rotatable end wall supporting said tubular member for axial reciprocable movement therein; a piston carried by said tubular member, and being movable in said cylinder to axially move the tubular member and gripping means to strip the insulation from the severed end; a flow passage through said end wall connecting the interior of said cylinder with the interior of said tubular member for admitting air from said cylinder for flow through said tubular member and discharge in a stream from said one end, whereby the material is supported and guided by said air stream into the cutters from said one end, said passage being controlled by rotational movement of said end wall.

7. Apparatus for cutting a filamentary material, comprising: power actuated cutters; a pair of rotatably mounted feed rollers adapted to engage the material and advance the material in a direction towards said cutters; pneumatically actuated means selectively operable to relatively move said rollers into feeding engagement with the material, and out of engagement with the material; a tensioning member adapted to frictionally grip the material in advance of its entering the feed rollers; a support for said tensioning member enabling limited movement of said member axially of said material; and spring means resiliently biasing said movement in a feeding direction of the material, whereby limited reverse movement of said material by said tensioning member will occur upon movement of the feeding rollers out of engagement with the material.

8. In apparatus having cutters for cutting a filamentary material, means for intermittently feeding the material in a direction towards said cutters, comprising: a housing having an internal recess; a first shaft rotatably mounted on said housing; a feed roller and a toothed driven pinion carried by said first shaft; a block member guidingly supported in said recess for limited vertical movement; a second shaft rotatably mounted on said block member; a feed roller and toothed pinion carried by said second shaft, said toothed pinions being meshed and the feed rollers being positioned on opposite sides of said material and cooperable to feedingly engage and disengage the material in response to the vertical movements of said block, while maintaining the pinions continuously meshed; means normally biasing said block towards its upper limit; and fluid energizable cylinder-piston means within said recess selectively operable to vertically move said block in opposite directions.

9. In apparatus having cutters for cutting a filamentary material, means for intermittently feeding the material in a direction towards said cutters, comprising: a housing having an internal recess; a first shaft rotatably mounted on said housing; a feed roller and a toothed driven pinion carried by said first shaft; a block member guidingly supported in said recess for limited vertical movement; a second shaft rotatably mounted on said block member; a feed roller and toothed pinion carried by said second shaft, said toothed pinions being meshed and the feed rollers being positioned on opposite sides of said material and cooperable to feedingly engage and disengage the material in response to the vertical movements of said block, while maintaining the pinions continuously meshed; means normally biasing said block towards its upper limit; axially aligned cylindrical recesses in said block, one of said recesses opening upwardly and the other cylindrical recess opening downwardly; upper and lower fixed pistons respectively having operative association with said cylindrical recesses; and means operable to selectively admit energizing fluid into the cylindrical recesses to move said block in opposite vertical directions.

10. In apparatus having cutters for cutting a filamentary material, means for intermittently feeding the material in a direction towards said cutters, comprising: a housing having walls defining an internal recess; a first shaft rotatably mounted on said housing; a feed roller and a toothed driven pinion carried by said first shaft; a block member guidingly supported in said recess for limited vertical movement between an upper and a lower of said walls; a second shaft rotatably mounted on said block member; a feed roller and toothed pinion carried by said second shaft, said toothed pinions being meshed and the feed rollers being positioned on opposite sides of said material and cooperable to feedingly engage and disengage the material in response to the vertical movements of said block, while maintaining the pinions continuously meshed; axially aligned cylindrical recesses in said block, one of said recesses opening upwardly and the other cylindrical recess opening downwardly; a fixed piston secured to said upper of said walls having operative association with said upwardly opening recess; compression spring means in the downwardly opening recess acting between the bottom of the recess and said lower of said walls to normally move said block in an upward direction towards said upper of said walls; and means operable to admit energizing fluid into the said upwardly opening recess to move said block in a downward direction towards said lower of said walls.

11. Apparatus for cutting relatively fine flexible insulated filamentary material, and stripping the insulation from a severed end thereof, comprising: cutters operable to closed position to sever said material and adjacent end portion of insulation; a tubular member through which the filamentary material is guided to said cutters, one end of said member being positioned adjacent said cutters; gripping means carried by said member, and operable to grip said filamentary material following a cutting operation; means for axially moving the tubular member and gripping means to strip the insulation from the severed end; and means for supplying air under pressure to said tubular member for flow therethrough and discharge in a stream from said one end, whereby the projecting flexible material is supported in an extended position and guided by said air stream into the cutters from said one end.

References Cited in the file of this patent
UNITED STATES PATENTS

| | | |
|---|---|---|
| 1,626,119 | Olin | Apr. 26, 1927 |
| 1,831,115 | Holmes | Nov. 10, 1931 |
| 1,835,801 | Mayhew et al. | Dec. 8, 1931 |
| 2,285,167 | Montgomery | June 2, 1942 |
| 2,320,659 | Sahlin | June 1, 1943 |
| 2,571,338 | Calabrese | Oct. 16, 1951 |
| 2,765,685 | Statman et al. | Oct. 9, 1956 |
| 2,768,688 | Wheeler et al. | Oct. 30, 1956 |